United States Patent [19]

Christian et al.

[11] Patent Number: 5,407,262

[45] Date of Patent: Apr. 18, 1995

[54] REINFORCED MODULAR OFFICE FILE AND FURNITURE SYSTEM

[75] Inventors: Sorensen C. Christian; Scott W. Clausen, both of Racine, Wis.

[73] Assignee: Sunsor, Inc., Racine, Wis.

[21] Appl. No.: 106,118

[22] Filed: Aug. 13, 1993

[51] Int. Cl.⁶ ............................................. A47B 47/00
[52] U.S. Cl. ............................. 312/257.1; 312/265.4; 312/249.12; 312/265.1; 312/249.8; 108/190; 211/46; 211/162; 211/184; 211/189
[58] Field of Search .................. 312/257.1, 184, 265.1, 312/249.8; 211/46, 45, 162, 184, 182, 189; 403/168–178, 171, 170, 176; 108/111, 151

[56] References Cited

U.S. PATENT DOCUMENTS

| | | | |
|---|---|---|---|
| 3,642,310 | 2/1973 | Hudson | 312/257.1 X |
| 3,966,285 | 6/1976 | Porch et al. | 312/265.4 |
| 4,045,104 | 8/1977 | Peterson | 312/265.4 |
| 4,187,649 | 2/1980 | Chaffee | 312/265.1 X |
| 4,437,412 | 3/1984 | Trautsch | 312/257.1 X |
| 4,744,475 | 5/1988 | St. Pierre | 211/182 X |
| 5,002,191 | 5/1991 | Herbst | 312/257.1 X |
| 5,016,948 | 5/1991 | Welch et al. | 312/249.12 |

Primary Examiner—Kenneth J. Dorner
Assistant Examiner—Robert J. Sandy
Attorney, Agent, or Firm—Maksymonko & Slater

[57] ABSTRACT

A system of office furniture and files including combinations of tubular leg and other vertical and lateral members interconnected by orthogonal joint connectors and channels to structurally strengthen and aesthetically appoint the furniture pieces. The channels require no special mounting or alignment and are automatically positioned and retained to the tubular members and joint connectors. The channels include spaced upper and lower holes at each end, one of the holes being substantially equal to the outer diameter of the tubular member while the other hole is substantially equal to the inner diameter whereby the larger hole is positioned and slid over the tubular member and the smaller hole is rigidly sandwiched between an end of the tubular member and the connector joint whereby the channels are thereby and automatically positioned and rigidly retained in fixed, predetermined relationship to the tubular members.

1 Claim, 2 Drawing Sheets

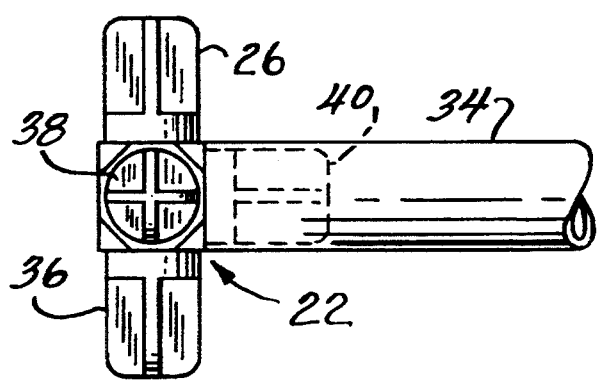
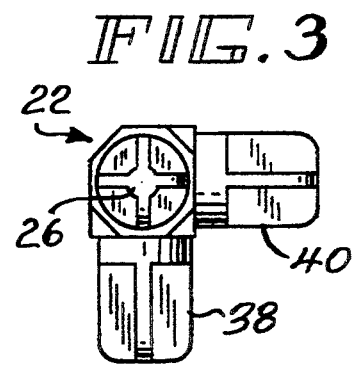
FIG.2
FIG.3
FIG.4
FIG.6
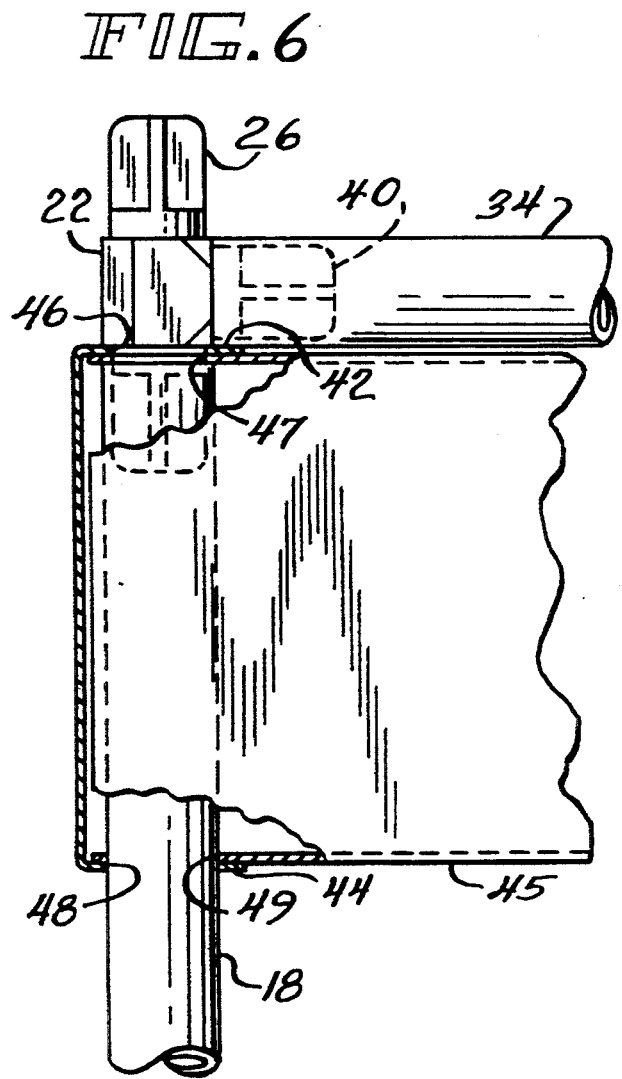
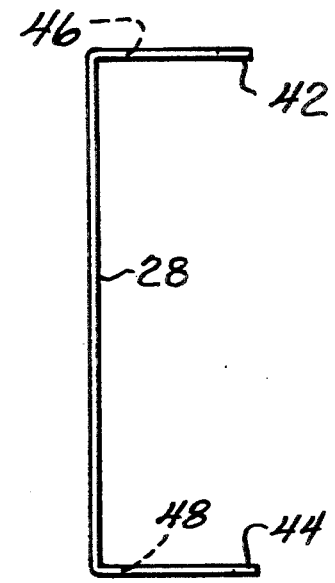
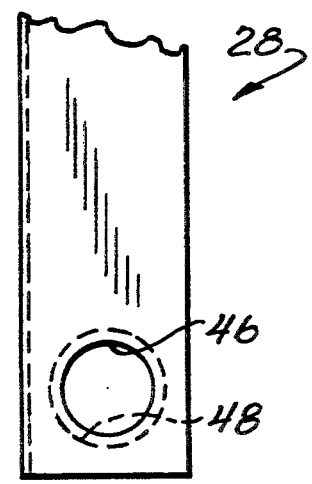
FIG.5

REINFORCED MODULAR OFFICE FILE AND FURNITURE SYSTEM

BACKGROUND OF THE INVENTION

The present invention relates to office furniture and filing systems of a structurally strong and reinforced nature while simultaneously maintaining an attractive and aesthetically pleasing appearance, in particular, a relatively 'petite' appearance that belies the true structural integrity of the furniture piece.

The structural arrangement of the present invention further facilitates a 'family' of furniture pieces in which structural elements or modules may be combined in differing configurations to create tables, filing systems, desks, computer and typewriter stands, shelves and other furniture pieces of correspondingly differing sizes and capacities. The present system, for example, permits fabrication of single, dual and triple level furniture pieces simply by the selection of appropriate joint connectors and the progressive assembly of additional levels thereon—much like the addition of another floor in the construction of a new building. Both fixed-position systems as well as 'rolling' systems, i.e. systems with castors fitted to the legs for movement within the office environment, are herein contemplated.

A variety of prior art systems have been proposed, some including tubular and multi-axis joint connectors while others have utilized diagonal braces, gusset plates and similar well-known mechanisms to achieve varying degrees of structural rigidity. None, however, combine the petite appearance and modularity of the present invention with the requisite structural integrity.

The need for a strong, rigid design cannot be overemphasized when it is remembered that office furniture may be heavily loaded (e.g. typewriters, computers, piles of files etc) and often subjected to substantial side-loads imposed while pushing the furniture over rough floors, carpets, molding strips and door sill jams.

It has been found that ordinary tube/joint systems do not have sufficient strength to resist the side-loads (e.g. bending moments) placed on the connector joints under many of the above-described conditions. It is easy to appreciate how such overloading can occur in view of the fact that furniture pieces may extend more than forty inches above the floor; that usually only one leg encounters a 'resistive' barrier to movement at any given moment; and that the more weight placed on the furniture piece, the more resistance to motion the obstruction will offer and, correspondingly, the more lateral force that will be required to overcome such blockage.

And to compound this already ill-conceived scenario, the momentum of a moving piece of furniture—should the piece suddenly stop (e.g. upon the unexpected encounter with an 'immovable' obstacle)—translates into, and imparts, a hugh angular moment to the affected leg joint that may exceed several thousand inch-pounds. Although tubular/joint construction has many advantages, including modularity, easy of fabrication, automatic spacing of shelves, racks and member, it simply cannot handle the large angular moments in the ordinary work-place environment.

While angular bracing and gusset plates represent well-known strength-enhancing solutions, neither is deemed to be aesthetically satisfactory and, further, both increase the complexity and time required to assemble furniture pieces. (As with 'Christmas toys', the lay consumer is generally saddled with assembly responsibility). The present invention, therefore, seeks to combine the modularity of tubular construction with a reinforcement system that is strong, easy to assemble, and that mates and comports well, in a design-sense, with a tubular superstructure.

As described in more detail hereinafter, the present invention utilizes special channels, arranged adjacent and parallel to the tubular members, to enhance furniture rigidity and strength. It should be noted that these channels are not utilized, as might first be suspicioned, as ordinary load-bearing beams, nor are they bolted, welded or otherwise rigidly interconnected to define a self-sustaining rigid box structure. Rather, the height of the channel (with its upper and lower lip surfaces) acts, in concert with the tubular members, to define a 'parallelogram' (in this case, a rectangle) that serves to relieve and redistribute stress otherwise acting directly on the joint connectors and to absolutely preclude the angular rotation of any leg with respect to the other legs and to the overall furniture structure.

To this end, and to minimize assembly complexity and time, the present invention employs a system of channel self-positioning and self-locking. No alignment or positioning is required. Nor are any special or additional channel attachment mechanisms required.

More specifically, two channels are provided and required adjacent each tubular joint connector. These channels are dimensioned, in the first instance, so that the upper and lower channel lips or surfaces may overlap thereby providing an interference-free mating therebetween. A pair of holes are provided in each channel end, as described more fully herein, to capture the tubular leg members and to effect the above-noted channel positioning and locking.

A first hole, having a diameter substantially equal to, but slightly larger than, the outer diameter of the leg member, is placed in the lower channel lip. This hole permits the sliding engagement of the leg therethrough while being of such close dimensional tolerance that the leg may not move freely laterally within the hole. The second hole, placed in the upper channel lip, is dimension substantially equal to, but slightly larger than, the inner diameter of the leg member, but in no event may it be of diameter greater than the outer leg diameter. Thus, the leg member, while freely moving through the lower lip hole, is blocked from insertion or movement through the upper lip hole. This is key to the automatic alignment and retention of the channels.

The various lateral and vertical (leg) tubular members are relatively rigidly interconnected by joint connectors. Joint connectors are characterized by plural, and generally orthogonally-oriented extensions that are forced into tube ends thereby rigidly retaining the several tubular members in fixed, orthogonal relationship to one-another. (Although 'rigidly' interconnected, it must again be stressed that the tubes and joint connectors are susceptible to deformation and failure under the bending moments placed thereon during normal use.) The joint extensions are dimensioned, in cross-section, substantially equal to, but slightly larger than, the inner diameter of the tube members thereby facilitating the above-noted rigid engagement between the joints and tubes.

In view of the above discussion relating to the engagement between the joint connectors and tubes, it will be understood that the upper channel holes, while too small to admit passage of the tubular legs, does allow passage of the joint extensions. Thus, the channel is positioned and retained by the expedient of sliding the leg member upwardly through the lower channel hole until the leg contacts the upper channel lip, thereafter, forcing the joint extension downwardly through the upper lip into the tubular leg member.

When fully engaged, the channel upper lip is tightly 'sandwiched' between the leg member and joint (in a fixed, predetermined position) and consequently prohibited from sliding either upwardly or downwardly along the leg. In fact, two channels—the adjacent channels that define the corresponding sides of each corner—are simultaneously positioned and captured under each joint connector and, again, in a manner not necessitating channel alignment nor additional channel mounting or retention hardware. It will be appreciated that the upper and lower holes may be reversed with the lower channel lip being captured and rigidly held between the lower end of the tubular member and the joint connector, now positioned below the channel.

As noted, the strength of the above-described combination structure is not achieved through the intrinsic load-bearing capability of the channel members alone, rather, by reason of the height of the channels and the corresponding spacing, in particular, of the lower channel lip below the joint connector. The existence of the lower channel lip precludes the rotational movement of the tubular leg about the joint essentially converting any angular moment to a relatively non-destructive linear force.

The upper channel lip serves two strength-increasing functions. First, it, too, functions to inhibit rotational leg movement. Second, it acts as a direct linear brace against the inadvertent, forced release of the joint extensions from the lateral tubular members. In this manner—short of literally destroying the channel members—the structural integrity of the furniture piece is virtually assured.

The above-described combination provides important aesthetic as well as structural benefits. As noted, there are known prior art bracing arrangements that solve the strength problem. But strength, alone, does not make an acceptable furniture product particularly when considerations of office decor must be weighed. While the overall aesthetics may not be fully appreciated from the figures herein, it is significant that the structural combination of adjacent tubes and channels removes the appearance of 'sterility' and 'blandness' that is believed to otherwise manifest with either tubes or channels, alone.

It is therefore an object of the present invention to create a family of stands, racks, and furniture, particularly suited for use in an office environment. It is another object that the furniture be modular, that is, defined by a limited number of component types which are combinable to produce differing, larger or multi-level furniture pieces. A further object is a furniture line that is suitably rugged and aesthetically acceptable. A further object is a furniture line that requires no special assembly talent; that is not complex in structure or assembly; and that may be assembled quickly. A further object is to provide dual functional members that serve both aesthetic and reinforcing functions.

BRIEF DESCRIPTION OF THE DRAWINGS

FIG. 2 is a front elevation view of an intermediate joint connector of the file of FIG. 1 shown with one extension thereof inserted into a tubular member;

FIG. 3 is a top plan view of the intermediate joint connector of FIG. 2;

FIG. 4 is a front elevation view of a channel of the file of FIG. 1; and,

FIG. 5 is a fragmentary top plan view of the end of the channel of FIG. 4.

FIG. 6 is a fragmentary front elevation view of the file of FIG. 1 detailing the interconnection of the channels, tube members, and joint connector in one corner thereof.

DESCRIPTION OF THE PREFERRED EMBODIMENT

Figure 1:
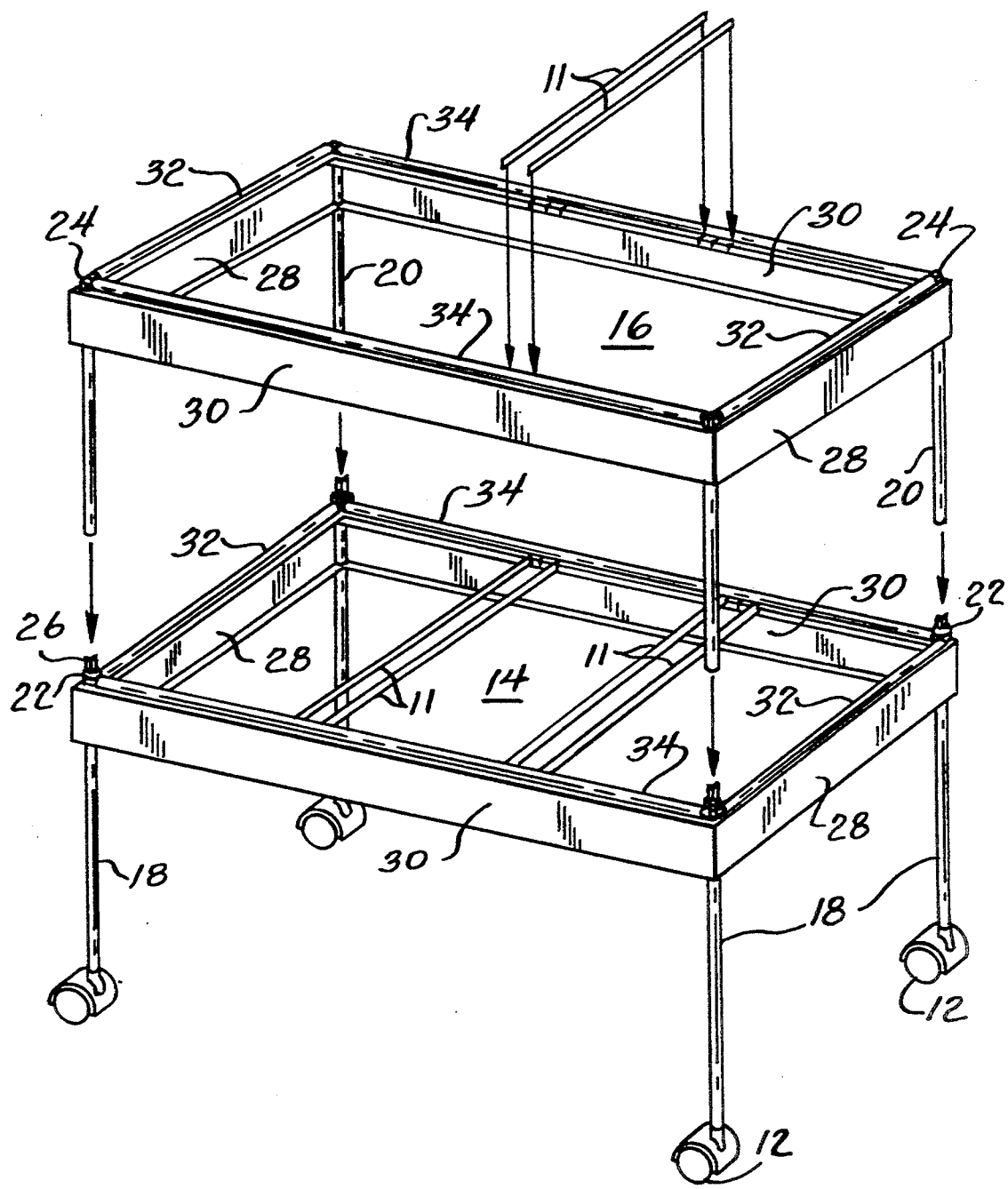
FIG. 1 is a perspective view of a two-level rolling file according to the present invention shown with the upper-level file module detached from, and spaced above, the lower-level to more clearly illustrate system modularity.

FIG. 1 illustrates a typical piece of office furniture 10 fabricated according to the present invention. More particularly, furniture piece 10 is a two-level rolling rack adapted, in the present case, for the retention of so-called 'hanging files'. The files (not shown) literally 'hang' from the parallel rails 11 appropriately spaced along the rack according to the file sizes in use. It should be understood, however, that furniture piece 10 is merely exemplary of the present invention and the discussion that follows applies with equal force to a wide variety of furniture pieces including, for example, shelves, tables, typewriter and computer stands, and desks. The rails 11 may, in short, be omitted and suitable table surfaces or shelving substituted therefor.

The file rack 10 of FIG. 1 is known as a 'rolling file' by reason of castors 12 affixed to the legs thereof. Although the furniture system of the present invention is particularly adapted to the 'rolling' environment (by reason of the side-loads typically induced on the legs of furniture during the rolling movement thereof), it will be appreciated that the structure described herein is applicable to, and contemplates, fixed, non-rolling furniture as well.

The present furniture system is 'modular' in that virtually all of the furniture pieces may be fabricated from a relatively limited number of components and, further, multi-level/section furniture pieces may be realized merely by replicating the basic structure as required. Thus, and referring again to FIG. 1, the two-level file rack 10 shown therein is comprised of substantially similar lower and upper rack modules 14 and 16, respectively.

Each module 14 and 16 is comprised of four channels, including two end channels 28 and two side channels 30; four lateral tube members, including a pair of end tubes 32 and a pair of side tubes 34; four joint connectors 22 or 24; and four vertical risers 18 or 20.

Upper 16 and lower 14 modules differ only in the lengths of the corresponding tubular riser members 18 and 20 and in the configurations of the joint connectors 22 and 24. Specifically, risers 20 determine the spacing between the retained files while risers 18 (which form the legs of the rack) set the distance of the lower rack above the floor. With reference to the joint connectors 22 and 24, intermediate connectors 22 incorporate an additional upward extension 26 (not found in the terminal connectors 24), which extension is required to engage and retain the upper module risers 20.

FIGS. 2 and 3 illustrate an intermediate joint connector 22 of the type utilized on the lower module 14. Connectors 22 include four orthogonally disposed, peg-like male extensions 26, 36, 38, and 40 adapted for locking engagement within tubes 20, 18, 32, and 34, respectively. The cross-sectional dimension of the extensions is substantially equal to, but slightly larger than, the inside diameter of the tube members thereby facilitating a snug, locking force fit between the joint connector and tube member upon insertion of the joint extension into the tube member. Extensions 38 and 40 engage the lateral end and side tubes 32 and 34, respectively, while extensions 26 and 36 engage risers 20 and legs 18, respectively. Terminal connectors 24 are substantially identical to the intermediate connectors 22 except that intermediate connectors 22 need not include the upwardly protruding extension 26.

FIGS. 4 and 5 depict the C-shaped channels 28 of the present invention including upper and lower channel lips 42 and 44 having, respectively, upper and lower holes 46 and 48 therein. Side channels 30 have a substantially identical cross-section (to that of the end channels 28) including corresponding upper and lower channel lips 43 and 45 with respective upper and lower holes 47 and 49.

One difference in channel cross-sections, however, is apparent from an inspection of FIG. 6, namely, that the heights of the respective channels 28 and 30 (and therefore the spacing between respective upper and lower lips) are not equal. Although equal channel heights may be utilized, differential heights is preferred to effect the mating and nesting of one channel, channel 30 in this case, into the other channel (channel 28).

Referring again to FIGS. 4 and 5, the lower holes 48,49 preferably have a diameter substantially equal to the tube members thereby permitting insertion and passage of, for example, legs 18 therethrough, while the upper holes 46,47 are of slightly smaller diameter—substantially equal to the inner diameter of the tube members—thereby blocking passage of the tube members therethrough while, importantly, admitting passage of the lower connector extension 36 (See FIG. 6).

The structural interrelationship of the various tube members, the channels and the joint connectors is best shown in FIG. 6. FIG. 6 depicts the front left corner of the lower module 14 of FIG. 1. As noted above, side channel 30 nests inside end channel 28 such that the respective lower holes 48, 49 and upper holes 47,48 are in alignment. As used herein, alignment connotes the axial coincidence of the holes required to permit the insertion and movement of tubular members, e.g. legs 18, or joint extensions, e.g. 36, therethrough.

As discussed in the background section of the present specification, a principal feature of the present invention is an aesthetically pleasing family of office furniture preferably fabricated using modular tube/joint technology, yet, being of sufficient strength to withstand normal office machine/file loading. To this end—and consistent with the desire to maintain a professional, decorative appearance—an inexpensive, non-complex, and easy to install arrangement for reinforcing the otherwise unacceptably fragile tube/joint structure is required. The present combination of tube/joint and channel technologies meets the above 'appearance', 'strength' and simplicity objectives.

The elegance of the present invention—including the ease of fabrication, the strength of the completed structure, the absence of alignment, and the resulting aesthetic appearance—will become apparent by further reference to FIG. 6.

First, it should be observed that the channels 28 and 30 need not be welded, bolted or otherwise attached to each other, nor is any attachment or alignment of these channel required with respect to the tube/joint structure other than the mere insertion of the appropriate tubes through the channel holes provided, in turn, into engagement with the mating joint extensions. Such action is essentially that which is required to assemble the tube/joint frame, without any channels, and consequently the channels are positioned, aligned and rigidly retained—all without additional effort or skill.

More specifically, and still referring to FIG. 6, legs 18 are inserted upwardly through channel holes 48, 49 and into engagement with the downwardly oriented joint extensions 36. This is all that is required to position and lock the channels 28 and 30 in proper position. To better appreciate how the simple engagement between legs 18 and joints 22 effects positioning and locking of the channels, it must be remembered that dimensions are selected, as discussed above, to admit passage of the tubular legs 18 through the lower, but not upper, holes. The upper holes, by reason of their reduced diameters, admit passage of the joint extensions, e.g. 36, only.

Thus, as each joint extension 36 is urged into locking engagement into the upper end of associated leg 18, the lower channel lips 44,45 freely slide along the leg until the joint extension is fully seated within the leg. At this point, the upper channel lips 42,43 (with their respective smaller holes 46,47 therein) are captured between the joint 22 and leg 18. Neither channel can thereafter move upwardly or downwardly, nor—due to the sizing and close tolerances of the holes—can either channel move laterally.

The above construction advantageously positions the lateral tubes 32,34 parallel to, and just above, the corresponding channels 28,30. This combined relationship is believed to remove the 'spindly' appearance of the tube/joint structure when utilized alone and, similarly, the 'boxey, unornamented, and bland' character of channels, again, when used as the sole structural members.

It will be further appreciated that the channels effectively remove the torsional moments from the joint connectors 22,24 which would otherwise be induced thereon by lateral pressures against legs 18 and risers 20. These side loads are distributed over the relatively greater distance defined by the height of the channels and essentially converted into lateral shear loads acting on the respective upper and lower channel lips. In this manner substantially greater leg side-loads can be accommodated, indeed, to the point where the tubular legs themselves fail and buckle.

The above discussion has centered on the lower or floor module 14 of the two-level rack 10 depicted in FIG. 1. As noted, many variations are contemplated within the scope of the present invention both in function and in size and configuration. Thus, for example, multiple level furniture pieces, such as the two-level rack of FIG. 1, can be created by 'stacking' modules vertically one atop another. When additional vertical modules are contemplated, a joint connector of the type shown as 22 in FIGS. 2,3 and 6 should be employed. This connector has an additional upwardly protruding extension 26, the principal purpose of which is to engage and secure the risers 20 from the module 16 thereabove (FIG. 1).

The spacing between modules may be altered as desired by the appropriate selection of risers 20 (i.e. the lengths thereof). The upward extensions 26 may be removed from the joints, e.g. joints 24, of top-most module although such extensions may be utilized in connection with a restraint system or in a decorative capacity. For example, a railing or wall may be placed around a top shelf, affixed to these extensions, to secure items thereon from inadvertently rolling off the shelf.

It will further be appreciated that joint connectors may be configured with additional extensions, or the joint connectors reoriented, to provide for the sectioning of modules or for a multi-module level. For example, a single level could be fabricated using six legs and six joint connectors thereby defining two sections, each section being configured for a specific and separate function. It should also be understood that the term "tubular member" as used herein contemplates tubes of any convenient cross-section including, for example, square, rectangular or oval and any other configuration that permits aperture holes to be formed in the channels and engagement of the tubular members with appropriate joint connector extensions.

We claim:

1. Furniture apparatus including plural generally vertical tubular riser members and plural generally horizontal tubular lateral members, each tubular member having first and second opposed ends thereon; plural joint means, each joint means being associated with a riser member and with one or more lateral members for rigidly interconnecting an end of the riser member and each of said lateral members, the joint means including plural extension means, each extension means for insertion into an end of a riser or lateral tubular member thereby rigidly retaining such tubular member in fixed, predetermined relationship to the joint means; one or more channel members, each channel member having spaced apart upper and lower lips with apertures therein, the apertures in one of the lips being of sufficient cross section to admit the sliding passage of tubular riser members therethrough while the apertures in the other lip being of appropriate cross-section to block passage of the riser members while admitting passage of the joint extension means whereby the other lips of one or more channel members is sandwiched between each joint means and associated riser member thereby automatically positioning and rigidly retaining the channel members in predetermined relationship to the riser member whereby the channel members structurally reinforce the tubular members to produce a strong furniture structure that may be quickly and easily assembled.

* * * * *

UNITED STATES PATENT AND TRADEMARK OFFICE
CERTIFICATE OF CORRECTION

PATENT NO. : 5,407,262
DATED : April 18, 1995
INVENTOR(S) : Sorensen et al.

It is certified that error appears in the above-indentified patent and that said Letters Patent is hereby corrected as shown below:

Title page, item [75], replace name of inventor (two occurrences) from:

first occurrence: "Christian et al.", to --Sorensen et al.-- second occurrence:
"[75] Inventors: Sorensen C. Christian;" to
--[75] Inventors: Carl C. Sorenen Signed and Sealed this Sixth Day of February, 1996

Attest:

BRUCE LEHMAN

Attesting Officer      *Commissioner of Patents and Trademarks*